W. C. FREEMAN.
Manufacture of Wooden Scoops.

No. 212,678.     Patented Feb. 25, 1879.

WITNESSES:
Henry N. Miller
C. Sedgwick

INVENTOR:
W. C. Freeman
BY Munn & Co
ATTORNEYS.

UNITED STATES PATENT OFFICE.

WILLIAM C. FREEMAN, OF LOUISIANA, MISSOURI.

IMPROVEMENT IN THE MANUFACTURE OF WOODEN SCOOPS.

Specification forming part of Letters Patent No. 212,678, dated February 25, 1879; application filed November 23, 1878.

*To all whom it may concern:*

Be it known that I, WILLIAM C. FREEMAN, of Louisiana, in the county of Pike and State of Missouri, have invented a new and useful Improvement in the Manufacture of Wooden Scoops, of which the following is a specification:

Bowls for wooden scoops have heretofore been made by sawing the lumber into thin boards, then steaming the strips and bending them to the desired shape, as described in Letters Patent granted to me July 16, 1878.

The present invention is an improvement in the manufacture of scoop-bowls, whereby they can be made more economically and with less waste of material.

The invention will first be described in connection with the drawings, and then pointed out in the claim.

Figure 1:
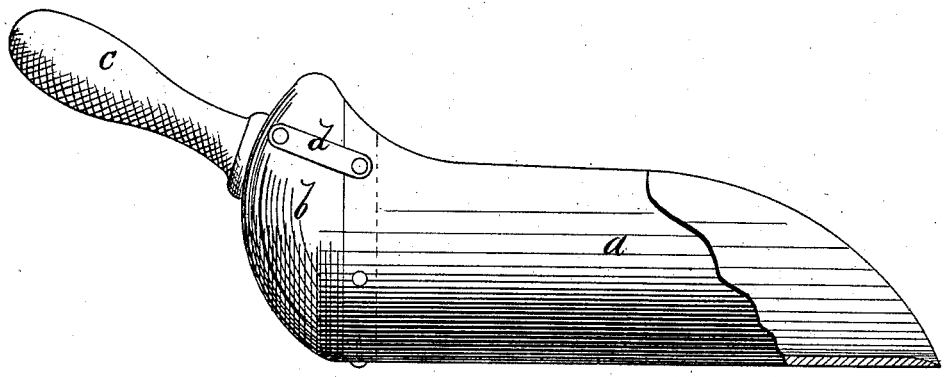
Figure 2:
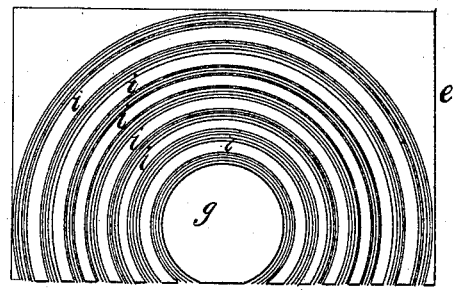

In the accompanying drawings, Figure 1 is sectional elevation of a scoop, showing its shape and construction. Fig. 2 is a view illustrating the manner of cutting the bowls from a block of wood, as more particularly explained hereinafter.

Similar letters of reference indicate corresponding parts.

$a$ is the bowl, $b$ the head, and $c$ the handle, of the scoop, these parts being separate pieces of wood. The head $b$ is rabbeted, and the bowl $a$ is secured to the rabbet by pins or nails and glue, and strengthened by a metal strap, $d$, at each side.

The handle $c$ is formed with a pin, that enters a hole in base $b$, where it is held by screwing and gluing.

The bowl $a$ is made by sawing it from a block of wood with a barrel or cylindrical saw of any usual or desired character. The manner of sawing out the bowls from the block is illustrated in Fig. 2. $e$ is the block. A small-sized saw is first used to take out the core $g$. Then a saw slightly larger is made use of to saw out the smallest size of the bowls (represented at $i$.) The next larger will be sawed by a larger saw, and so on to the largest. By this means only the core and corners of the block are wasted. The bowls thus cut out are ready for attachment to the handle-head $b$ without further work, except trimming and chamfering the edges and point.

The scoop constructed as described is substantial, and can be made cheaper than wooden scoops as heretofore made.

I am aware that tubular saws are not new, nor do I claim anything new in the means by which the parts of the scoop are shaped; but, What I do claim as my invention is—

A scoop whose body $a$ consists of an unbent wooden veneer, or circular section of a wooden block, as shown and described.

WILLIAM CARROLL FREEMAN.

Witnesses:
 W. G. SISSON,
 OREGON BROWN.